Aug. 18, 1936.　　　A. M. SWIGERT, JR　　　2,051,502
MEASURING INSTRUMENT
Filed May 2, 1932　　　2 Sheets-Sheet 1
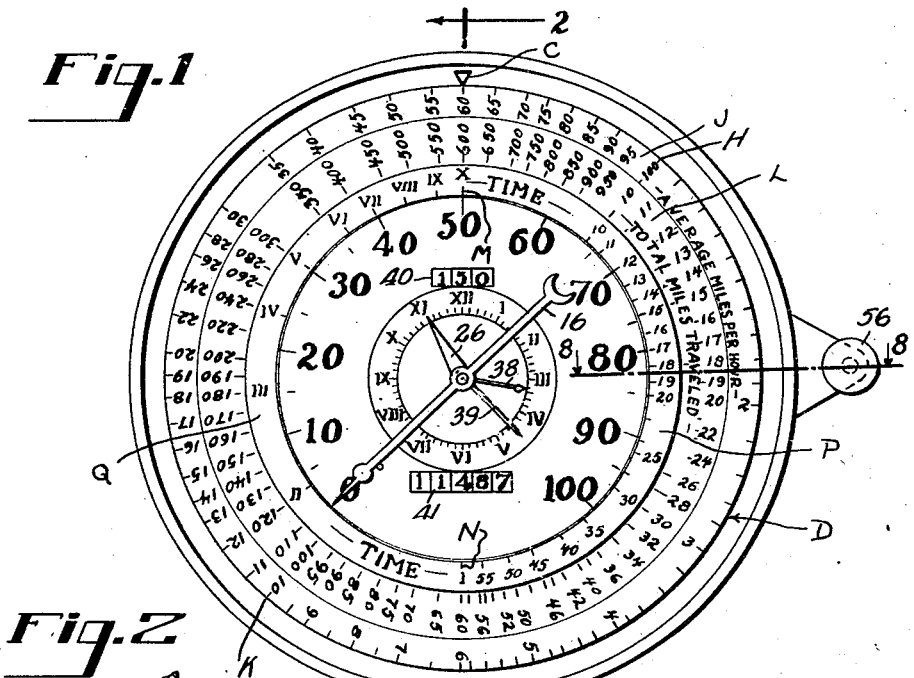
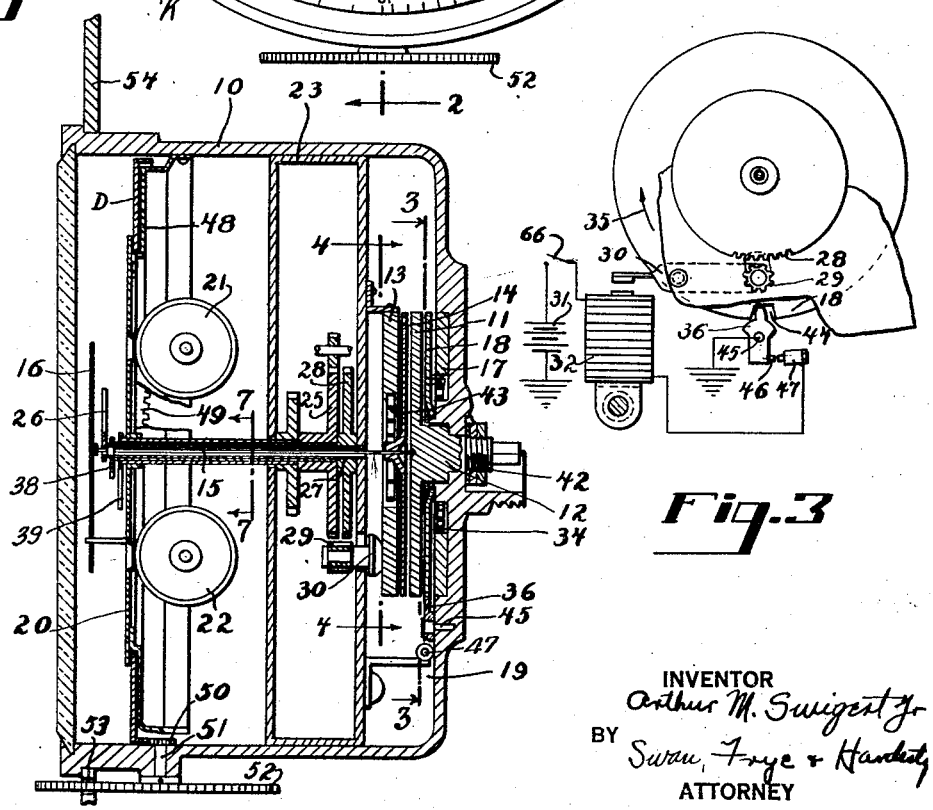
INVENTOR
Arthur M. Swigert Jr.
BY Swan, Frye & Hardesty
ATTORNEY Aug. 18, 1936.   A. M. SWIGERT, JR   2,051,502
MEASURING INSTRUMENT
Filed May 2, 1932   2 Sheets-Sheet 2

INVENTOR
Arthur M. Swigert Jr.
BY Swan, Frye & Hardesty
ATTORNEY

Patented Aug. 18, 1936

2,051,502

UNITED STATES PATENT OFFICE 2,051,502

MEASURING INSTRUMENT

Arthur M. Swigert, Jr., Detroit, Mich.

Application May 2, 1932, Serial No. 608,659

2 Claims. (Cl. 161—15)

This invention relates to measuring, indicating and calculating devices, particularly for vehicles and other conveyances, and has for an important object the provision of an assembly incorporating therewith a speedometer and clock adapted to function independently and in the conventional manner, together with a special clock hand adapted to indicate only the actual running time of the vehicle, and a calculating chart by means of which the operator can quickly and easily compute the average speed which he has maintained during a trip.

A further object of the invention is the provision of such a computer in the manipulation of which only the distance covered and running time consumed need be known and used to form the bases for the calculation, and in which the running time and the distance are adapted to be registered by the indicating portion of the instrument so that they are readily available to the user, while the calculating device, which operates similarly to that disclosed in my copending application, Serial Number 604,713, filed April 12, 1932, is incorporated therewith in such manner as to form a symmetrical assembly of pleasing appearance and to be most advantageously positioned for convenient and effective operation.

Another object of my invention is the provision in such a device of a calculator by means of which the average speed necessary to be maintained to cover a known distance in a given time may easily and quickly be computed.

Still another object is the provision of novel and simple means whereby a clock mechanism of conventional construction may be embodied in a speedometer, together with an auxiliary hand adapted to register the running time only of a vehicle upon which it is installed, in a novel and efficient manner which provides extremely simple means for coupling the auxiliary hand to the clock mechanism while the vehicle is running, and disconnecting the same when the vehicle stops.

Other objects and advantages will be apparent from the following description, wherein reference is made to the accompanying drawings illustrating preferred embodiments of my invention, and wherein similar reference numerals designate similar parts throughout the several views.

In the drawings:

Figure 1 is a front elevational view of a device incorporating one form of my invention;

Figure 2 is a central vertical sectional view thereof taken substantially on the line 2—2 of Figure 1 and looking in the direction of the arrows;

Figure 4:
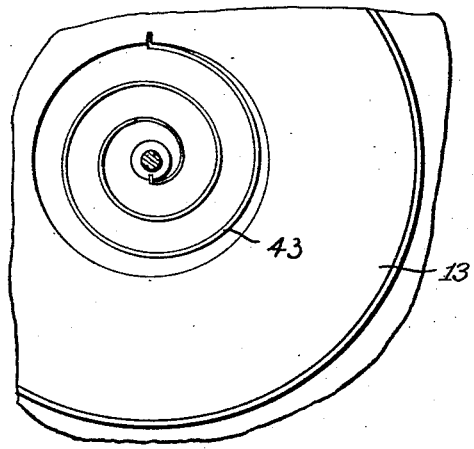
Figure 5:
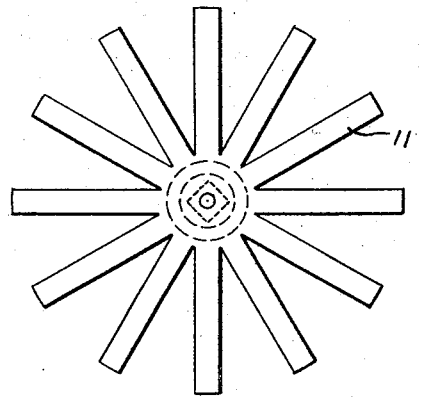
Figure 6:
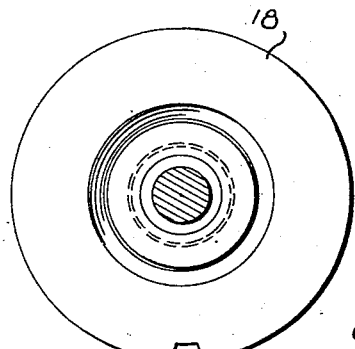
Figure 7:
Figure 8:
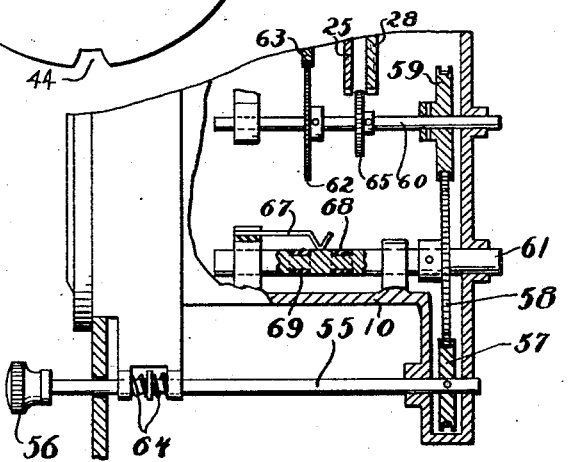

Figure 3 comprises a fragmentary detail sectional view, partly broken away, taken substantially on the line 3—3 of Figure 2 and looking in the direction of the arrows, with additional connected elements indicated in schematic diagram;

Figure 4 is a detail section taken substantially on line 4—4 of Fig. 2 and looking in the direction of the arrows, enlarged and partly broken away, corresponding to a fragmentary plan view of one of the fixed magnets showing the restraining spring;

Figure 5 is a plan view of the star wheel;

Figure 6 is a plan view of one of the armatures, its restraining spring being omitted;

Figure 7 is an enlarged detail sectional view taken substantially on the line 7—7 of Figure 2 and looking in the direction of the arrow, and Figure 8 is a fragmentary detail section taken substantially on the line 8—8 of Figure 1 and looking in the direction of the arrows.

Referring now to the drawings: Reference character 10 designates a casing, which may be similar in size and shape to that of an ordinary speedometer, or somewhat larger if desired. The speedometer drive may be of the usual or any desired variety, and is shown extending substantially centrally into the rear of the case. While the details of construction of the speedometer itself are unimportant, in the type shown the driving cable or flexible shaft (not shown) is connected to the coupling 42 and drives a star wheel 11, the integral shaft 12 of which is journaled in the rear wall of the casing. The teeth of the wheel rotate in the field of a fixed magnet 14, while between the magnet and the star wheel is arranged an armature comprising a relatively light metallic disc 14 in which eddy currents are set up by rotation of the star wheel which tend to cause rotation of the armature. The armature shaft 15 of course carries the speedometer needle 16 in the usual manner. In my preferred construction I arrange upon the opposite side of the star wheel 11 another fixed magnet 17 between which and the star wheel is interposed another armature 18 which may be of similar construction to the first. The speedometer needle 16 and armature 14 are yieldably held against rotation by a hair spring 43, and the more rapidly the star wheel is rotated the greater is the induced drag upon the armature and so the farther up the scale the needle is turned. This mechanism forms no part of my invention, however, and need only be considered in connection with the additional switch operating means which I couple thereto and which is actuated by the armature 18.

Between this driving assembly, which is housed in a chambered portion at the rear of the casing, generally designated 19, and the front portion of the casing which carries the dial 20 and odometer assemblies 21—22, is arranged a clock mechanism, which may be of conventional construction, and the details of which are accordingly not shown, housed in a casing 23 which is preferably of magnetic material to protect the clock mechanism from the fields of the magnets, acting as a shield for that purpose. The innermost hand shaft of the clock is hollowed to permit free passage of the speedometer needle shaft 15 therethrough. The final gear of the train embodied in the clock mechanism which drives the hour hand 38 is designated 25. I provide an additional running time hand 26 adapted to be driven at the same speed as the hour hand of the clock while the vehicle is running, but to be stopped while the vehicle is at rest. The running time hand is carried by a tubular shaft 27 which telescopes within the other tubular hand carrying shafts of the clock and carries adjacent the hour hand gear 25 a driving gear 28, which may be of the same diameter as the gear 25. Sufficient friction is provided in the journalling of the running hand time shaft 27 to prevent the hand from turning save when positively coupled to the driving mechanism of the hour hand, in a manner to be described.

To automatically couple the gears 25—28 while the vehicle is running, and to uncouple them when the vehicle stops, I provide an idler gear 29 journaled on a pivoted hanger 30 and wide enough to mesh simultaneously with both gears. Instead of the gear 28 and pinion 29, one or both may be formed as a toothless friction drive member if it is desired to avoid the slight inaccuracy which might be caused by partial turning of one gear with respect to the other as the idler is brought into mesh with the gears 25—28. The arm 30 is thrown to bring the idler into mesh by means of an electromagnet 32, of which the arm 30 may constitute the armature. The electromagnet may be energizable from the storage battery 31 of the car, as diagrammatically illustrated in Figure 3, if the device is used upon an automobile, and in series therewith may be a switch adapted to be moved by the armature 18 to close the circuit to the electromagnet when the star wheel 11 commences to revolve, which it of course does as soon as the vehicle begins to move. The armature 18 is shown yieldably held against turning by the hair spring 34, and peripherally notched as at 44. Within the notch engages a tooth of the pallet piece 36, which is formed integrally with the switch arm and pivoted upon the rear wall of the casing as upon the pin 45. Upon turning of the armature, due to rotation of the star wheel, in the direction indicated by the arrow 35 of Figure 3, caused by forward movement of the vehicle, the pallet or switch lever 36 is swung until its contact 46 engages the contact member 47, as diagrammed in Figure 3, where it is held as long as sufficient torque is applied by the armature 18 due to its tendency to rotate. The contact 47 is connected in series with the solenoid 32 and battery 31. The switch 66, the purpose of which will presently be described, is normally closed, while the other battery terminal and the switch lever 36 are grounded. It will thus be seen that upon movement of the vehicle and closing of the switch contacts 46—47, the electromagnet 32 will throw the idler 29 into mesh with the gears 25—28, and so cause driving of the running time hand 26 by the hour hand driving mechanism of the clock, while when the vehicle stops, the armature 18 will be returned to rest position by its hair spring 34, and the switch will reassume the open position in which it is shown in Figure 3, to release the idler and so the running time hand. It will be seen that by virtue of this construction the hand 26 will be moved by the clock mechanism only when the vehicle is running, and will accordingly register only the running time of the vehicle, while the hour and minute hands 38, 39 of the clock may be continuously and independently turned thereby in the conventional manner. The operation of this special running time mechanism will also be seen not to interfere with the speedometer and odometer portions of the mechanism. The latter, forming no part of my invention, need not be here shown or described in detail, it being considered sufficient to observe that they register the distance covered by the vehicle upon trip dials 40 and total mileage dials 41 in the usual fashion.

Any suitable means may of course be provided for setting the clock hands and the running time hand 26. My preferred mechanism for this purpose is best shown in Figure 8, and comprises a slidable shaft 55, supported by the casing 10 of the instrument, adapted to project through the instrument panel and carrying the adjusting knob 56. The shaft 55 is connected, through a gear train comprising gears 57, 58 and 59, with a countershaft 60 which is rotatable by turning the knob 56 and slidable by pushing or pulling upon the knob by reason of the overlapping edges provided upon gears 57, 59, which overhang the intermediate gear 58, in the manner shown in the drawing. All three of the shafts 55, 60 and 61 are slidably carried in suitable bearings formed in the housing. The shafts are yieldably held in the position in which they are shown, in which the gear 62 engages the winding gear 63 of the clock mechanism by centering springs 64 against the resistance of which the shaft 55 may be moved in either direction to throw the setting gear 65 into mesh with the running time hand gear 28 or the hour hand gear 25, as desired. It will be seen that when this mechanism is in the position shown, the clock mechanism may be wound by merely turning the knob 56, while upon pushing the knob inwardly the winding gears are disengaged and the driving gear meshed with the running time hand gear 28 to enable setting the running time hand by turning the knob. Conversely, by pulling the knob outwardly, the gear 25 which forms part of the gearing driving the clock hands, is engaged by the gear 65 to enable setting the clock, while the winding gears 62—63 are also disengaged.

To free the idler 29 during such a hand-setting operation, to prevent undesired movement of all the hands at once, I provide a switch, generally designated 66, in series with the solenoid 32 arranged to break the circuit to the solenoid and so free the idler during the hand-setting operation. This switch may comprise a wiping contact blade 67 of spring metal, which presses against the grounded shaft 61 when the setting mechanism is in the rest position shown, while when the shaft is shifted in either direction one of the insulating collars 68—69, is interposed between the spring contact and the shaft, and the circuit to the solenoid so broken. Obviously any other suitable switch means might be employed for this purpose, that shown being illustrative merely.

Upon the dial 20, outside and preferably in a manner easily distinguishable from the conventional miles-per-hour scale is inscribed in any suitable fashion a scale indicating time in minutes and hours and reading from ten minutes to ten hours.

This fixed time scale comprises a minute portion P and an hour portion Q. Commencing at a point designated M the minute portion of the scale advances clockwise in logarithmic order to sixty minutes in one hundred eighty degrees, while the remaining one hundred eighty degrees of the dial is occupied by the hour scale Q which runs from one hour at the point N (which corresponds to 60 on the minute scale) to ten hours at the point M. The hour scale is preferably subdivided into suitable five-minute or other smaller divisions.

Surrounding the fixed dial is a rotatable dial D journalled upon the support 48 for the fixed dial 20, in the manner shown in Figure 2. The dial D is formed with an inbent edge carrying crown teeth 49, and means is provided for rotating the dial, which may comprise a pinion 50 carried by the shaft 51 extending through the side of the casing and carrying pinned or otherwise secured to its outer extremity, a thumb wheel 52, which may when the device is installed, project through a slot 53 in the instrument panel 54 in the manner shown.

The rotatable dial D carries two separate calibrations, commencing at a common point, H. The outer scale J is calibrated in miles-per-hour and increases clockwise from 1 (at the point designated H) to 10, in logarithmic order, the point at which the 10 falls being designated K, and arranged 180° from the point of beginning (H). The scale then advances from 10 to 100, also in logarithmic order, in the remaining 180°. This outer scale, which I utilize to designate average miles-per-hour, will thus be seen to comprise in reality two logarithmic scales, each occupying 180° and so arranged that they constitute a single scale reading from 1 to 100.

On the same dial, and similarly arranged, I provide a scale L denominated "Total miles traveled", also beginning and ending at the point H and reading from 10 to 1,000. This also comprises two logarithmic scales successively arranged and each occupying 180°. The first will be seen to extend from the point H, in a clockwise direction, as viewed in Figure 1, to point K, and to read from 10 to 100, while the remainder of the scale occupies the remaining 180° and reads from 100 to 1,000.

The calibrations of the rotatable dial are adapted to be cooperatively aligned with the time indicia of the fixed scale P—Q.

In using the device to check the performance of an automobile upon a trip, for example, the operator before starting would set the running time hand 26 at zero, as well as the trip mileage indicator 21. In place of the latter procedure he might of course merely record the indication of the total mileage indicator 22. Upon completing the run, knowing accurately the number of miles traveled and the actual running time consumed, the rotatable dial D may be turned to align the nearest calibration of the "Total miles traveled" scale L with the proper running time calibration of the fixed time dial P—Q. The outer scale J of the rotatable dial will then indicate at the point marked by the arrow C the average speed of the vehicle during the run. The operation of the device will be seen to depend upon the logarithmic division of mileage by time, in a manner akin to the operation of a slide rule, but the practicality, and indeed the possibility of utilizing the device at all for the specific use for which my calculator is designed, will be seen to depend on its novel features of design and arrangement which are more fully set forth in my afore-mentioned copending application, Serial Number 604,713 filed April 12, 1932.

Figure 1 may be utilized to illustrate numerous typical uses of the device. If, for example, one had traveled 180 miles in 3 hours, he could align the 180 of scale L with the 3-hour mark of scale Q, in which position the dial is shown; and the arrow C would point to 60 miles per hour as the average speed, as there shown. Similarly if one had traveled 120 miles in two hours, 30 miles in 30 minutes, or any other distance in a period of time necessitating a speed of 60 miles per hour, the positioning of the dial and so the reading of the instrument would be the same, as an inspection of the figure will show. (Note that the numbers mentioned in pairs are aligned with each other, e. g.: 30 miles on scale L registers with 30 minutes on scale P).

So also if one wishes to travel 90 miles in one hour and a half, he may align the 90 mile mark of scale L with the line of scale Q representing one hour and thirty minutes, and the arrow will indicate that a speed of 60 miles per hour must be maintained, etc.

While it will be apparent that the illustrated embodiments of my invention herein disclosed are well calculated to adequately fulfill the objects and advantages primarily set forth, it is to be understood that the invention is susceptible to variation, modification and change within the spirit and scope of the subjoined claims.

What I claim is:

1. Vehicle timing mechanism including a rotatable member drivable in response to movement of a vehicle upon which it is installed, switching means adapted to be held in operable circuit closing position during the running time of the vehicle, comprising a movable armature drivable by said rotatable member, a swingable switch lever mounted adjacent the armature, said armature and switch lever being provided with coacting abutment portions, whereby upon movement of the vehicle and consequent turning of the rotatable member the armature is moved to throw said switch lever to closed position, and running time registering means operable in response to closing of the switch.

2. In a vehicle timing mechanism for use in conjunction with a magnetic driving element and registering means operable thereby and spaced from the magnetic element, and including a driving shaft; the combination of a clock mechanism interposed between the magnetic driving element and registering means and surrounding the driving shaft, a running time registering means drivable by the clockwork, a shaft connecting the clock mechanism and said last-named registering means and surrounding said first mentioned driving shaft, a magnetic shield interposed between the clock mechanism and the magnetic element, and means for coupling and uncoupling said last-named registering means and the clockwork in response to starting and stopping of the magnetic driving element.

ARTHUR M. SWIGERT, Jr.